United States Patent
Taya et al.

(10) Patent No.: US 9,587,131 B2
(45) Date of Patent: Mar. 7, 2017

(54) IMAGE RECORDING METHOD, INK SET, AND METHOD FOR PREPARING INK SET

(71) Applicant: CANON KABUSHIKI KAISHA, Tokyo (JP)

(72) Inventors: Akihiro Taya, Yokohama (JP); Masahiro Terada, Kawasaki (JP); Hidetaka Kawamura, Yokohama (JP); Yohei Masada, Tokyo (JP); Masanobu Ootsuka, Tokyo (JP); Takaharu Aotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 14/315,147

(22) Filed: Jun. 25, 2014

(65) Prior Publication Data
US 2015/0002577 A1  Jan. 1, 2015

(30) Foreign Application Priority Data

Jun. 28, 2013 (JP) .................................. 2013-137046

(51) Int. Cl.
| | |
|---|---|
| *C09D 11/38* | (2014.01) |
| *B41M 5/00* | (2006.01) |
| *B41M 7/00* | (2006.01) |
| *B41J 2/01* | (2006.01) |
| *C09D 11/40* | (2014.01) |
| *C08K 5/06* | (2006.01) |

(52) U.S. Cl.
CPC ................ *C09D 11/38* (2013.01); *B41J 2/01* (2013.01); *B41M 5/007* (2013.01); *B41M 5/0023* (2013.01); *B41M 5/0047* (2013.01); *B41M 5/0064* (2013.01); *B41M 7/009* (2013.01); *C09D 11/40* (2013.01); *C08K 5/06* (2013.01)

(58) Field of Classification Search
None
See application file for complete search history.

(56) References Cited

U.S. PATENT DOCUMENTS

| | | | |
|---|---|---|---|
| 2004/0114013 A1* | 6/2004 | Doi ....................... | C09D 11/322 347/100 |
| 2009/0098312 A1* | 4/2009 | Goto .................... | B41J 2/17513 427/595 |

(Continued)

FOREIGN PATENT DOCUMENTS

| | | |
|---|---|---|
| CN | 102203197 A | 9/2011 |
| CN | 102781677 A | 11/2012 |

(Continued)

*Primary Examiner* — Christopher Polley
(74) *Attorney, Agent, or Firm* — Canon U.S.A., Inc., IP Division

(57) ABSTRACT

An image recording method includes a conveyance process for conveying a recording medium and an ink-applying process for applying a first ink and a second ink to the recording medium, wherein the first ink and the second ink contain a surfactant represented by Formula (1), the amount of the surfactant represented by Formula (1) in the first ink is greater than the amount of the surfactant represented by Formula (1) in the second ink, and a liquid X prepared by removing the surfactant represented by Formula (1) from the first ink and a liquid Y prepared by removing the surfactant represented by Formula (1) from the second ink satisfy a particular condition.

6 Claims, 1 Drawing Sheet

(56) References Cited

U.S. PATENT DOCUMENTS

| | | | |
|---|---|---|---|
| 2009/0263632 A1 | 10/2009 | Kojima | |
| 2010/0112219 A1* | 5/2010 | Yokohama | C09D 11/38 427/256 |
| 2014/0368593 A1* | 12/2014 | Kanasugi | B41J 2/0057 347/103 |

FOREIGN PATENT DOCUMENTS

| | | |
|---|---|---|
| CN | 102971386 A | 3/2013 |
| JP | 2007-146135 A | 6/2007 |
| JP | 2010-064478 A | 3/2010 |

\* cited by examiner

IMAGE RECORDING METHOD, INK SET, AND METHOD FOR PREPARING INK SET

BACKGROUND OF THE INVENTION

Field of the Invention

The present invention relates to an image recording method, an ink set, and a method for preparing an ink set.

Description of the Related Art

In recent years, there has been a demand for image recording apparatuses, such as ink jet recording apparatuses, capable of higher-speed recording. In high-speed recording using a plurality of inks, adjacent drops of different inks on a recording medium sometimes coalesce before absorption of the inks. This phenomenon is called bleeding. In order to prevent the bleeding phenomenon, the surface tension relationship between a plurality of inks has been studied (Japanese Patent Laid-Open Nos. 2010-064478 and 2007-146135).

Japanese Patent Laid-Open No. 2010-064478 discloses a method for preventing the bleeding phenomenon by decreasing the difference in surface tension between all the inks to 1.0 mN/m or less. Japanese Patent Laid-Open No. 2007-146135 discloses a method for preventing the bleeding phenomenon by lowering the surface tension of a black ink than the surface tension of chromatic color inks. Bleeding is conspicuous between the black ink and chromatic color inks.

SUMMARY OF THE INVENTION

An image recording method according to aspects of the present invention includes a conveyance process for conveying a recording medium and an ink-applying process for applying a first ink and a second ink to the recording medium, wherein the first ink and the second ink contain a surfactant represented by Formula (1), the amount of the surfactant represented by Formula (1) in the first ink is greater than the amount of the surfactant represented by Formula (1) in the second ink, and a liquid X prepared by removing the surfactant represented by Formula (1) from the first ink and a liquid Y prepared by removing the surfactant represented by Formula (1) from the second ink satisfy the following condition. An ink set according to aspects of the present invention contains a first ink and a second ink, wherein the first ink and the second ink contain a surfactant represented by Formula (1), the amount of the surfactant represented by Formula (1) in the first ink is greater than the amount of the surfactant represented by Formula (1) in the second ink, and a liquid X prepared by removing the surfactant represented by Formula (1) from the first ink and a liquid Y prepared by removing the surfactant represented by Formula (1) from the second ink satisfy the following condition. A method for preparing an ink set according to aspects of the present invention includes adding a surfactant represented by Formula (1) to each of a liquid X and a liquid Y that satisfy the following condition, wherein the amount of surfactant represented by Formula (1) added to the liquid X is greater than the amount of surfactant represented by Formula (1) added to the liquid Y.

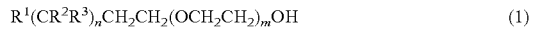

$$R^1(CR^2R^3)_nCH_2CH_2(OCH_2CH_2)_mOH \quad (1)$$

In the general formula (1), $R^1$ denotes a fluorine atom or a hydrogen atom, $R^2$ and $R^3$ independently denote a fluorine atom or a hydrogen atom, and at least one of $R^2$ and $R^3$ denotes a fluorine atom. n is 1 or more and 30 or less, and m is 1 or more and 60 or less.

When performing recording on a recording medium having a water absorption rate coefficient Ka of 0.1 mL/m²·ms$^{1/2}$ or more and 0.3 mL/m²·ms$^{1/2}$ or less such that a liquid X recording area comes into contact with a liquid Y recording area, the liquid Y flows from the liquid Y recording area into the liquid X recording area.

Aspects of the present invention can provide an image recording method by which the bleeding phenomenon can be suppressed, an ink set, and a method for preparing an ink set.

Further features of the present invention will become apparent from the following description of exemplary embodiments with reference to the attached drawings.

DESCRIPTION OF THE EMBODIMENTS

Figure 1:
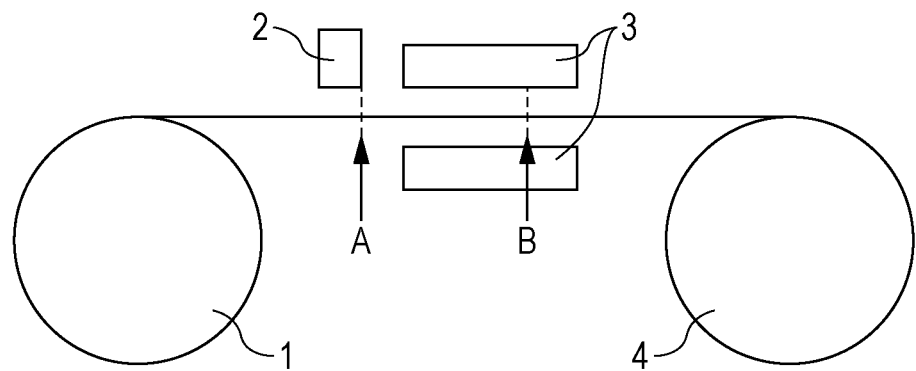
FIG. 1 is a schematic view of an image recording apparatus for use in an image recording method according to an embodiment of the present invention.

However, the present inventors found that the bleeding phenomenon may occur even using an image recording method according to Japanese Patent Laid-Open No. 2010-064478 or 2007-146135.

The present invention provides an image recording method by which the bleeding phenomenon can be suppressed, an ink set, and a method for preparing an ink set.

The present invention will be described in detail in the following embodiments.

The present inventors first examined the cause for bleeding in the related art described in Japanese Patent Laid-Open No. 2010-064478 or 2007-146135, which described the surface tension relationship between a plurality of inks. Although the related art defines the surface tension relationship between different inks from the perspective of the "inflow" between the inks, it has been found that other factors also affect the surface tension relationship. More specifically, it has been found that the inflow relationship between inks cannot be analyzed with respect to the ink surface tension alone, and the inflow between inks cannot be prevented only by controlling the ink surface tension.

Thus, the present inventors analyzed the inflow relationship between inks using the following test method. The test method is described in detail below.

An image is recorded on a recording medium using two types of liquid, a first liquid and a second liquid, such that a recording area of the first liquid comes into contact with a recording area of the second liquid. The inflow relationship is analyzed by visually inspecting a recording area from which a liquid inflow occurs. A liquid inflow is difficult to observe in a recording medium having high liquid absorbency, such as plain paper. On the other hand, in a recording medium having no liquid absorbency, such as glass or a poly(vinyl chloride) film, a liquid inflow may occur toward either recording area and is therefore difficult to identify. Thus, a recording medium for use in the test has a water absorption rate coefficient Ka of 0.1 mL/m²·ms$^{1/2}$ or more and 0.3 mL/m²·ms$^{1/2}$ or less. The recording medium having a water absorption rate coefficient Ka of 0.1 mL/m²·ms$^{1/2}$ or more and 0.3 mL/m²·ms$^{1/2}$ or less may be a print sheet. Examples of commercially available media having a water absorption rate coefficient Ka of 0.1 mL/m²·ms$^{1/2}$ or more and 0.3 mL/m²·ms^(1/2) or less include OK top coat+ (manufactured by Oji Paper Co., Ltd., Ka=0.18), Tokuryo Art (manufactured by Mitsubishi Paper Mills, Ltd., Ka=0.12), and Recycle Coat T-6 (manufactured by Nippon Paper Industries Co., Ltd., Ka=0.29).

The present inventors then studied a method for suppressing the bleeding phenomenon with an ink set that had a definite inflow relationship between the inks determined using the test method. As a result, the present inventors has completed the present invention in which the amount of (added) surfactant represented by Formula (1) is adjusted.

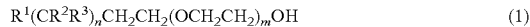

$$R^1(CR^2R^3)_nCH_2CH_2(OCH_2CH_2)_mOH \quad (1)$$

(In the general formula (1), $R^1$ denotes a fluorine atom or a hydrogen atom, $R^2$ and $R^3$ independently denote a fluorine atom or a hydrogen atom, and at least one of $R^2$ and $R^3$ denotes a fluorine atom. n is 1 or more and 30 or less, and m is 1 or more and 60 or less.)

More specifically, the present inventors found that in a pair of liquids in which inflow between inks occurs in the test method, it is necessary to add a greater amount of surfactant represented by Formula (1) to an ink into which the other ink flows than to the other ink. This will be described below in detail.

Two inks finally prepared are referred to as a "first ink" and a "second ink". Liquids prepared by removing the surfactant represented by Formula (1) from the inks, that is, liquids in which the surfactant represented by Formula (1) constitutes 0 mass % are referred to as a "liquid X" and a "liquid Y". In other words, the first ink is prepared by adding the surfactant represented by Formula (1) to the liquid X, and the second ink is prepared by adding the surfactant represented by Formula (1) to the liquid Y. As a result of the evaluation of the inflow relationship between the liquids X and Y in the test method, "the liquid Y flows from a liquid Y recording area into a liquid X recording area". In this case, the bleeding phenomenon can be suppressed when the amount (mass %) of the surfactant represented by Formula (1) in the first ink (prepared by adding the surfactant represented by Formula (1) to the liquid X) is greater than the amount (mass %) of the surfactant represented by Formula (1) in the second ink (prepared by adding the surfactant represented by Formula (1) to the liquid Y).

The present inventors also found that the effect of suppressing the bleeding phenomenon is enhanced when the amount of solid components (pigment and resin) of the first ink is substantially the same as the amount of the solid components of the second ink. More specifically, the mass ratio of the solid content of the first ink to the solid content of the second ink can be 0.5 or more and 2.0 or less.

Thus, these constituents can synergistically produce their effects to achieve the advantages of the present invention.

[Image Recording Method]

An image recording method according to an embodiment of the present invention includes an ink-applying process of applying a first ink and a second ink to a recording medium, wherein the first ink and the second ink contain a surfactant represented by Formula (1). In the case that a liquid X prepared by removing the surfactant represented by Formula (1) from the first ink and a liquid Y prepared by removing the surfactant represented by Formula (1) from the second ink satisfy the following condition:

(Condition) "When performing recording on a recording medium having a water absorption rate coefficient Ka of 0.1 mL/m²·ms^(1/2) or more and 0.3 mL/m²·ms^(1/2) or less such that a liquid X recording area comes into contact with a liquid Y recording area, the liquid Y flows from the liquid Y recording area into the liquid X recording area." The amount (mass %) of the surfactant represented by Formula (1) in the first ink is greater than the amount (mass %) of the surfactant represented by Formula (1) in the second ink.

A heating process for heating a recording medium to which the inks are applied can further suppress the bleeding phenomenon. The heating process will be described later in detail.

FIG. 1 is a schematic view of an image recording apparatus for use in an image recording method according to an embodiment of the present invention. In the image recording apparatus illustrated in FIG. 1, recording is performed using a roll of recording medium, and the recording medium is rolled up after recording. The image recording apparatus includes a recording medium supply unit 1 configured to hold a roll of recording medium and supply the recording medium, an ink-applying unit 2 configured to apply inks to the recording medium, a heating unit 3 configured to heat the recording medium, and a recording medium collecting unit 4 configured to roll the recording medium on which an image is recorded. The recording medium is conveyed through the units using a conveying unit including a pair of rolls and a belt along a recording medium transport path represented by a solid line in the figure. The recording medium rolled up with the recording medium collecting unit 4 may be supplied to another apparatus to cut the recording medium into a desired size or bind the recording media.

In a conveying process of conveying a recording medium, the recording medium is preferably conveyed at a speed of 50 m/min or more, more preferably 100 m/min or more.

In an embodiment of the present invention, tension can be applied to a recording medium. In other words, an image recording apparatus can include a tension applying unit configured to produce tension. More specifically, a conveying mechanism between the recording medium supply unit 1 and the recording medium collecting unit 4 in FIG. 1 may include a tension applying unit configured to apply tension to a recording medium and/or a tension control unit configured to control the tension of the recording medium.

The tension applied to a recording medium can be 20 N/m or more. More specifically, in the ink-applying process, inks can be applied to a recording medium to which a tension of 20 N/m or more is applied. The swelling of fibers of the recording medium with water in the inks can be efficiently suppressed at a tension of 20 N/m or more. The tension applied to a recording medium is preferably 30 N/m or more, more preferably 40 N/m or more and 100 N/m or less.

The ink-applying process and the heating process will be described in detail below.

(1) Ink-Applying Process

In the ink-applying process, an ink is applied to a recording medium. An ink may be applied to a recording medium using an ink jet system. In other words, an image recording method according to an embodiment of the present invention may be an ink jet recording method. The ink jet system may be a thermal ink jet system or a piezoelectric ink jet system. In the thermal ink jet system, an ink is ejected through an ejection port of a recording head by the action of thermal energy. In the piezoelectric ink jet system, an ink is ejected through an ejection port of a recording head using a piezoelectric element.

The present invention can be applied to a one-pass recording system. The term "one-pass recording system", as used herein, refers to a recording system for recording an image on a unit area of a recording medium by a single relative scan between a recording head and the recording medium. The term "a relative scan between a unit area of a recording medium and a recording head", as used herein, refers to a relative scan operation of a recording head with respect to a unit area of a recording medium through the movement of the recording head or a relative scan operation of a unit area of a recording medium with respect to a recording head through the conveyance of the recording medium. In particular, the present invention can be applied to a recording system for recording a region of an image corresponding to the length of an ejection port array in a recording head through a single scan of the recording head (scanning in the width direction of a recording medium).

(2) Heating Process

An image recording method according to an embodiment of the present invention may include a heating process for heating a recording medium to which an ink is applied. The recording medium may be heated with a heater from the front side (the side to which an ink is applied) and/or the back side of the recording medium.

In the heating process, a recording medium to which an ink is applied is preferably heated to a surface temperature of 70° C. or more, more preferably 80° C. or more. In order to prevent the thermal deformation of the recording medium, the surface temperature of the recording medium may be 140° C. or less.

The phrase "the surface temperature of a recording medium to which an ink is applied", as used herein, refers to the surface temperature of a recording medium at a position that the recording medium reaches 0.5 seconds after the application of an ink to the recording medium. More specifically, after an ink is applied to an ink recording area X of a recording medium at a position A in FIG. 1, the ink recording area X moves from the position A to a position B in FIG. 1 by "V×0.5/60 (m)" in the recording medium conveyance direction, wherein V (m/min) denotes the conveyance speed of the recording medium. The surface temperature of the ink recording area X is measured at the position B. In exemplary embodiments of the present invention, the surface temperature of a recording medium was measured with a noncontact infrared thermometer digital radiation temperature sensor FT-H20 (manufactured by Keyence Corp.) at a position vertically separated by 10 cm from a surface of the recording medium.

Heating in the heating process may be continuously performed before, during, and after the application of an ink. Before the application of an ink to a recording medium, the recording medium is preferably not heated or is preferably heated to a surface temperature of 60° C. or less, more preferably 40° C. or less.

In the heating process, a recording medium may be heated while the recording medium is pressed, for example, with a pressure roller. Pressing a recording medium can improve the fixability of an image. A recording medium may be pressed during part of the heating process. A recording medium may be pressed stepwise. The heating process may be followed by a pressing process.

[Ink Set]

An ink set according to an embodiment of the present invention contains a first ink and a second ink. The first ink and the second ink contain a surfactant represented by Formula (1). In the case that a liquid X prepared by removing the surfactant represented by Formula (1) from the first ink and a liquid Y prepared by removing the surfactant represented by Formula (1) from the second ink satisfy the following condition:

(Condition) "When performing recording on a recording medium having a water absorption rate coefficient Ka of 0.1 mL/m²·ms$^{1/2}$ or more and 0.3 mL/m²·ms$^{1/2}$ or less such that a liquid X recording area comes into contact with a liquid Y recording area, the liquid Y flows from the liquid Y recording area into the liquid X recording area."

the amount (mass %) of the surfactant represented by Formula (1) in the first ink is greater than the amount (mass %) of the surfactant represented by Formula (1) in the second ink.

In addition to the first and second inks, an ink set according to an embodiment of the present invention may contain a plurality of other inks. An ink set containing at least two inks that satisfy the relationship described above has the advantages of the present invention. All the inks constituting the ink set may satisfy the relationship described above. For example, when an ink set contains a third ink in addition to the first and second inks, the first ink and the third ink, or the second ink and the third ink, as well as the first ink and the second ink, may satisfy the relationship described above.

Although the first and second inks of an ink according to an embodiment of the present invention will be described below, the same applies to other inks that constitute the ink set.

<Ink>

The first ink and the second ink according to an embodiment of the present invention contain a surfactant represented by Formula (1). The first ink and the second ink may also contain a coloring material, a water-soluble organic solvent, water, and/or another component. Components that can be used in the first and second inks according to an embodiment of the present invention will be described below.

Surfactant

An ink according to an embodiment of the present invention contains a surfactant represented by Formula (1).

$$R^1(CR^2R^3)_nCH_2CH_2(OCH_2CH_2)_mOH \qquad (1)$$

(In the general formula (1), $R^1$ denotes fluorine or hydrogen, $R^2$ and $R^3$ independently denote fluorine or hydrogen, and at least one of $R^2$ and $R^3$ denotes fluorine. n is 1 or more and 30 or less, and m is 1 or more and 60 or less.)

Examples of the surfactant represented by Formula (1) include FS-3100 (manufactured by Du Pont) and Megaface F-444 (manufactured by DIC Corp.).

The surfactant represented by Formula (1) preferably has a hydrophile-lipophile balance (HLB) of 4 or more and 15 or less, more preferably 6 or more and 10 or less, when measured using a Griffin method.

The amount of surfactant represented by Formula (1) may be 0.01 mass % or more and 3.00 mass % or less of the mass of the first ink. The amount of surfactant represented by Formula (1) may be 0.01 mass % or more and 3.00 mass % or less of the mass of the second ink.

The first ink and the second ink may also contain a nonionic surfactant that is different from the surfactant represented by Formula (1). In this case, the ratio of the mass of the surfactant represented by Formula (1) to the mass of the nonionic surfactant in the inks is 0.1 or more and 2.0 or less. Examples of the nonionic surfactant used in combination with the surfactant represented by Formula (1) include acetylene glycol and acetylene glycol-ethylene oxide adducts.

Coloring Material

An ink according to an embodiment of the present invention may also contain a coloring material. The coloring material may be a pigment or dye, which may be conventionally known. Use of a pigment may improve the water fastness of an image. The coloring material content of the ink is preferably 0.1 mass % or more and 15.0 mass % or less, more preferably 1.0 mass % or more and 10.0 mass % or less, of the total mass of the ink.

In the case that the coloring material is a pigment, the pigment may be of a resin dispersion type produced by using a resin as a dispersant (a resin-dispersed pigment containing a resin dispersant, a microcapsule pigment coated with a resin, or a resin-bonded pigment in which the pigment particle is chemically bonded to a resin via an organic group) or of a self-dispersion type having a hydrophilic group on the surface of the pigment particles (a self-dispersing pigment). A pigment of a different dispersion type may also be used in combination. Examples of the pigment include carbon black and organic pigments. The pigments may be used alone or in combination. A pigment of a resin dispersion type is produced by using a resin as a dispersant. The resin used as a dispersant can have a hydrophilic moiety and a hydrophobic moiety. More specifically, the resin may be a resin produced by the copolymerization of a monomer having a carboxy group, such as acrylic acid or methacrylic acid, and a monomer having an aromatic group, such as styrene, or a urethane resin produced using a diol having an anionic group, such as dimethylolpropionic acid. The resin used as a dispersant can have an acid value of 50 mgKOH/g or more and 300 mgKOH/g or less. The resin used as a dispersant can have a polystyrene equivalent weight-average molecular weight (Mw) of 1,000 or more and 15,000 or less when measured using gel permeation chromatography (GPC). The resin dispersant content of the ink is preferably 0.1 mass % or more and 10.0 mass % or less, more preferably 0.2 mass % or more and 4.0 mass % or less, of the total mass of the ink. The ratio of the resin dispersant content to the pigment content on a mass basis may be 0.1 or more and 1.0 or less.

A pigment for a black ink may be carbon black. Examples of the carbon black include Raven 1060, 1080, 1170, 1200, 1250, 1255, 1500, 2000, 3500, 5250, 5750, 7000, 5000 ULTRA II, and 1190 ULTRA II (manufactured by Columbian Carbon Co.); Black Pearls L, MOGUL-L, Regal 400R, 660R, and 330R, and Monarch 800, 880, 900, 1000, 1300, and 1400 (manufactured by Cabot Corp.); Color Black FW1, FW2, FW200, 18, S160, and S170, Special Black 4, 4A, and 6, and Printex 35, U, 140U, V, and 140V (manufactured by Degussa AG); and No. 25, No. 33, No. 40, No. 47, No. 52, No. 900, No. 2300, No. 2600, MCF-88, MA600, MA7, MA8, and MA100 (manufactured by Mitsubishi Chemical Corp.).

A pigment for a cyan ink may be a copper phthalocyanine pigment. The specific color index number may be C.I. Pigment Blue 1, 2, 3, 15, 15:2, 15:3, 15:4, 16, 22, or 60.

A pigment for a magenta ink may be a quinacridone pigment. The specific color index number may be C.I. Pigment Red 5, 7, 12, 48, 48:1, 57, 112, 122, 123, 146, 168, 184, 202, or 207.

A pigment for a yellow ink may be an azo pigment. The specific color index number may be C.I. Pigment Yellow 12, 13, 14, 16, 17, 74, 83, 93, 95, 97, 98, 114, 128, 129, 151, or 154.

In the case that the coloring material is a dye, the dye may be a water-soluble dye having an anionic group, such as a sulfonic acid group or a carboxy group. More specifically, the dye may be an acid dye, a direct dye, or a reactive dye described in the color index. The dye may also be a dye having an anionic group, such as a sulfonic acid group or a carboxy group, not described in the color index.

Aqueous Medium

An ink according to an embodiment of the present invention may also contain water and a water-soluble organic solvent. Water can be deionized water (ion-exchanged water). The water-soluble organic solvent may be a common water-soluble organic solvent. Examples of such a water-soluble organic solvent include alcohols, glycols, alkylene glycols, poly(ethylene glycol), nitrogen-containing compounds, and sulfur-containing compounds. These water-soluble organic solvents may be used alone or in combination. The water-soluble organic solvent can contain glycerin and diethylene glycol.

The water-soluble organic solvent content of the first ink is preferably 30 mass % or more, more preferably 40 mass % or more, and preferably 90 mass % or less. The water-soluble organic solvent content of the second ink is preferably 30 mass % or more, more preferably 40 mass % or more, and preferably 90 mass % or less.

The water content of the ink may be 10 mass % or more and 60 mass % or less of the total mass of the ink.

Other Components

In addition to the components described above, an ink according to an embodiment of the present invention may further contain a water-soluble organic compound that is solid at normal temperature, for example, a polyhydric alcohol, such as trimethylolpropane or trimethylolethane, urea, or a urea derivative, such as ethylene urea. An ink according to an embodiment of the present invention may also contain an additive agent, such as a surfactant other than the surfactants described above, a pH adjuster, an anticorrosive, a preservative, a fungicide, an antioxidant, a reducing inhibitor, an evaporation promoter, and/or a chelator.

<Recording Medium>

A recording medium for use in the present invention may be a common recording medium. Examples of the recording medium include permeable recording media, such as plain paper and glossy paper; less permeable recording media, such as print sheets; and non-permeable recording media, such as glass, plastics, and films. In particular, the recording medium can have a water absorption rate coefficient Ka of 0.3 mL/m$^2$·ms$^{1/2}$ or less.

Figure 2:
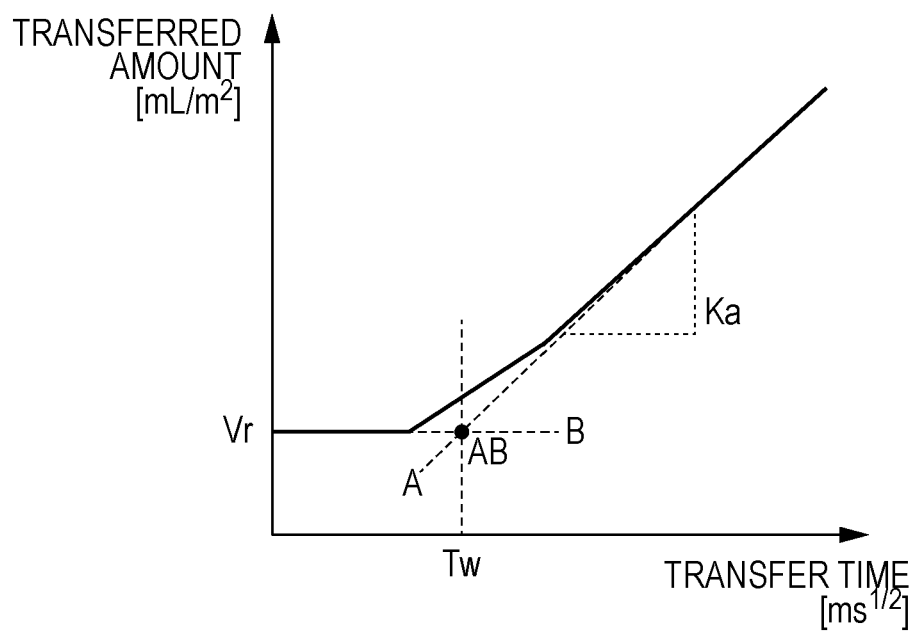
FIG. 2 is a graph of an absorption curve from which the absorption rate coefficient Ka of a recording medium is determined.

In the present invention, the absorption rate coefficient Ka of a recording medium is calculated using a Bristow method described in a JAPAN TAPPI pulp test method No. 51, "Kami oyobi itagamino ekitai kyushusei shiken hoho (liquid absorption test method for paper and paper board)". The Bristow method is described in many commercially available books and is not described in detail herein. The Bristow method is defined using the wetting time Tw, the absorption rate coefficient Ka (mL/m$^2$·ms$^{1/2}$), and the roughness index Vr (mL/m$^2$). FIG. 2 illustrates an absorption curve. The absorption curve illustrated in FIG. 2 is based on a permeability model, in which a liquid on a recording medium begins to permeate the recording medium after a wetting time Tw. The slope of a straight line after the wetting time Tw represents the absorption rate coefficient Ka. The absorption rate coefficient Ka corresponds to the permeation speed of the liquid in the recording medium. As illustrated in FIG. 2, the wetting time Tw is the time to reach an intersection point AB between an approximate straight line A, which is drawn using the least squares method and from which the absorption rate coefficient Ka is calculated, and a straight line B of V=Vr wherein V denotes the amount of liquid transferred and Vr denotes the roughness index. The liquid permeating the recording medium is water having a temperature of 25° C. Thus, Ka is a water absorption rate coefficient at 25° C.

As described above, "a recording medium having a water absorption rate coefficient Ka of 0.1 mL/m²·ms$^{1/2}$ or more and 0.3 mL/m²·ms$^{1/2}$ or less" is used in the test method for examining the inflow between inks. The reason for using such a recording medium is that the inflow between inks can be easily visually observed. The recording medium may be different from a recording medium to which the first and second inks are applied in the ink-applying process.

A recording medium for use in an ink jet recording method according to an embodiment of the present invention may be a recording medium having a desired size or a rolled recording medium, which is cut into a desired size after the image formation. It is easy to apply tension to a rolled recording medium.

Exemplary Embodiments

The present invention will be further described in the following exemplary embodiments and comparative examples. However, the present invention is not limited to these exemplary embodiments. Unless otherwise specified, "part" in the exemplary embodiments is on a mass basis.

<Preparation of Pigment Dispersion Liquid>

Preparation of Black Pigment Dispersion Liquid

A 500-mL recovery flask equipped with a mechanical agitator was placed in a chamber of an ultrasonic wave generator. 5.0 g of a vinyl resin having an acid value of 170 mgKOH/g and 120 mL of tetrahydrofuran were charged into the 500-mL recovery flask and were stirred while ultrasonic waves were applied thereto. Another container was charged with 10 g of carbon black Color Black FW18PS (manufactured by Degussa AG). 120 mL of tetrahydrofuran was added to the carbon black. The carbon black and tetrahydrofuran were mixed in a planetary mixer (manufactured by Kurabo Industries Ltd.) until the pigment surface became wet with the solvent. The carbon black was then mixed well with the vinyl resin in the 500-mL recovery flask.

Aqueous potassium hydroxide was added dropwise such that the neutralization ratio of the vinyl resin was 100%. This caused phase inversion. The mixture was then premixed for 60 minutes and was dispersed with Nanomizer NM2-L200AR (manufactured by Yoshida Kikai Co., Ltd.) for two hours. Tetrahydrofuran in the dispersion liquid was distilled off with a rotatory evaporator. The concentration of the dispersion liquid was adjusted with ion-exchanged water. Thus, a black pigment dispersion liquid having a pigment content of 5 mass % was prepared.

Preparation of Yellow Pigment Dispersion Liquid

A yellow pigment dispersion liquid having a pigment content of 5 mass % was prepared in the same manner as in the preparation of the black pigment dispersion liquid except that the vinyl resin having an acid value of 170 mgKOH/g was replaced by a vinyl resin having an acid value of 80 mgKOH/g and the carbon black Color Black FW18PS was replaced by C.I. Pigment Yellow 128.

Preparation of Magenta Pigment Dispersion Liquid

A magenta pigment dispersion liquid having a pigment content of 5 mass % was prepared in the same manner as in the preparation of the yellow pigment dispersion liquid except that C.I. Pigment Yellow 128 was replaced by C.I. Pigment Red 123.

Preparation of Cyan Pigment Dispersion Liquid

A cyan pigment dispersion liquid having a pigment content of 5 mass % was prepared in the same manner as in the preparation of the black pigment dispersion liquid except that the carbon black Color Black FW18PS was replaced by C.I. Pigment Blue 15:3.

<Preparation of Liquid Composition>

Preparation of Liquid Composition C

The following materials were mixed and dispersed while stirring well.

| | |
|---|---|
| Cyan pigment dispersion liquid (having a pigment content of 5 mass %) | 50 mass % |
| Glycerin | 23 mass % |
| Diethylene glycol | 23 mass % |
| Acetylenol (trade name) E100 (Acetylenol (trade name) surfactant manufactured by Kawaken Fine Chemicals Co., Ltd.) | 1 mass % |
| water | 3 mass % |

The mixture was then filtered with a glass filter AP20 (manufactured by Millipore) and was adjusted to pH 9.5 with aqueous potassium hydroxide. Thus, a liquid composition C was prepared.

Preparation of Liquid Composition M

A liquid composition M was prepared in the same manner as in the preparation of the liquid composition C except that the cyan pigment dispersion liquid was replaced by a magenta pigment dispersion liquid.

Preparation of Liquid Composition Y

A liquid composition Y was prepared in the same manner as in the preparation of the liquid composition C except that the cyan pigment dispersion liquid was replaced by a yellow pigment dispersion liquid.

Preparation of Liquid Composition Bk

A liquid composition Bk was prepared in the same manner as in the preparation of the liquid composition C except that the cyan pigment dispersion liquid was replaced by a black pigment dispersion liquid.

<Evaluation of Inflow Between Liquid Compositions>

The liquid compositions thus prepared was evaluated for inflow under the following condition. An ink cartridge was filled with each of the liquid compositions. A combination of a test solution 1 and a test solution 2 shown in Table 1 was used. The ink cartridge was mounted in an ink jet recording apparatus equipped with a piezoelectric ink jet head KJ4 (having a nozzle density of 600 dpi, manufactured by Kyocera Corp.). A solid image (recording duty 100%) formed of the test solution 1 and a solid image (recording duty 100%) formed of the test solution 2 were recorded side by side on an OK top coat+ sheet (basis weight 105 g/m²) having a water absorption rate coefficient Ka of 0.1 mL/m²·ms$^{1/2}$ or more and 0.3 mL/m²·ms$^{1/2}$ or less manufactured by Oji Paper Co., Ltd. The recording conditions include a temperature of 23° C., a relative humidity of 55%, an ink ejection frequency of 39 kHz, a recording medium conveyance speed of 100 m/min, and an ink ejection volume of approximately 13 μl per dot during recording. A recording duty of 100% in the ink jet recording apparatus refers to the conditions where 13 ng per dot of ink droplets were applied to a unit area of 1/600 inches×1/600 inches at a resolution of 600 dpi×600 dpi.

After the images were held at normal temperature for 24 hours, a recording area from which a liquid inflow occurred was visually examined. For example, a liquid inflow from the test solution 1 region to the test solution 2 region was represented by the inflow direction "the test solution 1→the test solution 2". Table 1 shows the results.

TABLE 1

Evaluation results of inflow between liquid compositions

| Combination No. | Test solution 1 | Test solution 2 | Inflow direction |
|---|---|---|---|
| Combination 1 | Liquid composition C | Liquid composition M | Test solution 1 → Test solution 2 |
| Combination 2 | Liquid composition C | Liquid composition Y | Test solution 1 → Test solution 2 |
| Combination 3 | Liquid composition C | Liquid composition Bk | Test solution 1 → Test solution 2 |
| Combination 4 | Liquid composition M | Liquid composition Y | Test solution 1 → Test solution 2 |
| Combination 5 | Liquid composition M | Liquid composition Bk | Test solution 2 → Test solution 1 |
| Combination 6 | Liquid composition Y | Liquid composition Bk | Test solution 2 → Test solution 1 |

[Preparation of Ink]

As shown in Table 2, inks were prepared from the liquid compositions. F-444 in the table denotes a fluorosurfactant Megaface F-444 manufactured by DIC Corp., which is a surfactant represented by Formula (1). F-444 has a HLB value in the range of 8.2 to 9.1 when measured using the Griffin method. AE-100 in the table denotes an Acetylenol (trade name) surfactant Acetylenol (trade name) E100 manufactured by Kawaken Fine Chemicals Co., Ltd.

TABLE 2

Preparation of ink

| | Liquid composition | | Surfactant | |
|---|---|---|---|---|
| Ink No. | Type | Content | Fluorosurfactant F-444 | Acetylenol (trade name) surfactant AE-100 |
| Ink C1 | Liquid composition C | 99.35 | 0.65 | 0 |
| Ink M1 | Liquid composition M | 99.00 | 1.00 | 0 |
| Ink Y1 | Liquid composition Y | 98.70 | 1.30 | 0 |
| Ink Bk1 | Liquid composition Bk | 99.22 | 0.78 | 0 |
| Ink C2 | Liquid composition C | 99.35 | 0 | 0.65 |
| Ink M2 | Liquid composition M | 99.00 | 0 | 1.00 |
| Ink Y2 | Liquid composition Y | 98.70 | 0 | 1.30 |
| Ink Bk2 | Liquid composition Bk | 99.22 | 0 | 0.78 |
| Ink C3 | Liquid composition C | 99.35 | 1.00 | 0 |
| Ink M3 | Liquid composition M | 99.00 | 1.00 | 0 |
| Ink Y3 | Liquid composition Y | 98.70 | 1.00 | 0 |
| Ink Bk3 | Liquid composition Bk | 99.22 | 1.00 | 0 |

(unit: parts)

[Evaluation]

In the evaluation criteria for the following evaluation items, A denotes an acceptable level, and B and C denote unacceptable levels.

<Presence or Absence of Bleeding Phenomenon>

In the same manner as in <Evaluation of Inflow Between Liquid Compositions>, the solid images (recording duty 100% for the two inks) were recorded with ink combinations shown in Table 3 on an OK top coat+ sheet and were checked for an inflow between the inks. The distance from a boundary of the two inks to the leading edge of the ink inflow was measured. The presence or absence of the bleeding phenomenon was rated in accordance with the following criteria. Table 3 shows the results.

A: The inflow distance was 0.2 mm or less.
B: The inflow distance was more than 0.2 mm and 1 mm or less.
C: The inflow distance was more than 1 mm.

<Presence or Absence of Beading Phenomenon>

In general, a beading phenomenon results in unevenness of color in a solid image. The solid images described above were visually inspected for the presence of unevenness of color and the presence of the beading phenomenon. The evaluation criteria were described below. Table 3 shows the results.

A: No unevenness of color was observed.
B: Unevenness of color was observed, or the recording medium was seen under the solid images.

TABLE 3

Ink Combination and Evaluation Result

| | Ink combination | | Evaluation result | |
|---|---|---|---|---|
| Exemplary embodiment No. | First ink | Second ink | Bleeding | Beading |
| Exemplary embodiment 1 | Ink M1 | Ink C1 | A | A |
| Exemplary embodiment 2 | Ink Y1 | Ink C1 | A | A |
| Exemplary embodiment 3 | Ink Y1 | Ink M1 | A | A |
| Exemplary embodiment 4 | Ink Bk1 | Ink C1 | A | A |
| Exemplary embodiment 5 | Ink M1 | Ink Bk1 | A | A |
| Exemplary embodiment 6 | Ink Y1 | Ink Bk1 | A | A |
| Comparative embodiment 1 | Ink M2 | Ink C2 | B | B |
| Comparative embodiment 2 | Ink Y2 | Ink C2 | B | B |
| Comparative embodiment 3 | Ink Y2 | Ink M2 | B | B |
| Comparative embodiment 4 | Ink Bk2 | Ink C2 | B | B |
| Comparative embodiment 5 | Ink M2 | Ink Bk2 | B | B |
| Comparative embodiment 6 | Ink Y2 | Ink Bk2 | B | B |
| Comparative embodiment 7 | Ink M3 | Ink C3 | C | A |
| Comparative embodiment 8 | Ink Y3 | Ink C3 | C | A |
| Comparative embodiment 9 | Ink Y3 | Ink M3 | C | A |
| Comparative embodiment 10 | Ink Bk3 | Ink C3 | B | A |
| Comparative embodiment 11 | Ink M3 | Ink Bk3 | C | A |
| Comparative embodiment 12 | Ink Y3 | Ink Bk3 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137046, filed Jun. 28, 2013, which is hereby incorporated by reference herein in its entirety.

What is claimed is:

1. An image recording method, comprising:
a conveyance process for conveying a recording medium; and
an ink-applying process for applying a first ink and a second ink to the recording medium,
wherein the first ink and the second ink comprise a surfactant represented by Formula (1)

$$R^1(CR^2R^3)_n CH_2CH_2(OCH_2CH_2)_m OH \qquad (1),$$

wherein, in the general formula (1), $R^1$ denotes a fluorine atom or a hydrogen atom, $R^2$ and $R^3$ independently denote a fluorine atom or a hydrogen atom, and at least one of $R^2$ and $R^3$ denotes a fluorine atom, n is 1 or more and 30 or less, and m is 1 or more and 60 or less, the amount of the surfactant represented by Formula (1) in the first ink is greater than the amount of the surfactant represented by Formula (1) in the second ink, and a liquid X prepared by removing the surfactant represented by Formula (1) from the first ink and a liquid Y prepared by removing the surfactant represented by Formula (1) from the second ink satisfy the following condition:

wherein when performing recording on a recording medium having a water absorption rate coefficient Ka of 0.1 mL/m$^2$·ms$^{1/2}$ or more and 0.3 mL/m$^2$·ms$^{1/2}$ or less such that a liquid X recording area comes into contact with a liquid Y recording area, the liquid Y flows from the liquid Y recording area into the liquid X recording area.

2. The image recording method according to claim 1, wherein the first ink and the second ink comprise a water-soluble organic solvent, and the water-soluble organic solvent content of the first ink is 30 mass % or more, and the water-soluble organic solvent content of the second ink is 30 mass % or more.

3. The image recording method according to claim 1, further comprising a heating process for heating the recording medium to which the inks are applied.

4. The image recording method according to claim 3, wherein the recording medium to which the inks are applied is heated to a surface temperature of 70° C. or more.

5. The image recording method according to claim 1, wherein the recording medium is conveyed at a speed of 50 m/min or more in the conveyance process.

6. The image recording method according to claim 1, wherein the recording medium to which the first ink and the second ink are to be applied in the ink-applying process has a water absorption rate coefficient Ka of 0.3 mL/m$^2$·ms$^{1/2}$ or less.

* * * * *